United States Patent
Wu

(10) Patent No.: US 9,548,038 B2
(45) Date of Patent: Jan. 17, 2017

(54) 3D DISPLAY DRIVING METHOD, IMAGE PROCESSING METHOD AND 3D DISPLAY DEVICE

(71) Applicant: BOE TECHNOLOGY GROUP CO., LTD., Beijing (CN)

(72) Inventor: Yanbing Wu, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 156 days.

(21) Appl. No.: 13/968,554

(22) Filed: Aug. 16, 2013

(65) Prior Publication Data

US 2014/0049621 A1 Feb. 20, 2014

(30) Foreign Application Priority Data

Aug. 16, 2012 (CN) .......................... 2012 1 0293396

(51) Int. Cl.
*H04N 13/00* (2006.01)
*G09G 5/00* (2006.01)
*H04N 13/04* (2006.01)

(52) U.S. Cl.
CPC ............ *G09G 5/00* (2013.01); *H04N 13/0033* (2013.01); *H04N 13/0402* (2013.01); *H04N 13/0434* (2013.01); *H04N 13/0436* (2013.01); *H04N 13/0438* (2013.01)

(58) Field of Classification Search
CPC ... H04N 13/0429; H04N 13/0402; G09G 5/00
USPC ......................................................... 348/54
See application file for complete search history.

(56) References Cited

U.S. PATENT DOCUMENTS

| | | | | |
|---|---|---|---|---|
| 6,049,424 A | * | 4/2000 | Hamagishi | G02B 27/2214 345/419 |
| 6,426,594 B1 | * | 7/2002 | Ito | 315/169.1 |
| 2002/0167619 A1 | * | 11/2002 | Bietsch et al. | 349/1 |
| 2012/0019752 A1 | | 1/2012 | He et al. | |
| 2012/0154698 A1 | * | 6/2012 | Matsuhiro et al. | 349/15 |

FOREIGN PATENT DOCUMENTS

CN 102449533 A 5/2012

OTHER PUBLICATIONS

Second Chinese Office Action dated Sep. 2, 2014; Appln. No. 201210293396.4.

(Continued)

*Primary Examiner* — Jeffery Williams
(74) *Attorney, Agent, or Firm* — Ladas & Parry LLP

(57) ABSTRACT

The embodiments of the present invention relates to a 3D display device and a method for driving the 3D display device, the 3D display device comprising an Active Retarder (AR) (200) and a display panel (100), the display panel (100) comprising N first pixel regions and N second pixel regions, N being an integer larger than or equal to 1, the AR (200) comprising 2N signal electrode sets, each signal electrode set comprises at least one signal electrode, and each signal electrode set corresponding to at least one pixel region of the display panel (100). The embodiments of the present invention also relate to an image processing method and a 3D display device, which can avoid prominent variation in lightness received by the left and right eye when switching from a current frame to a next frame, and thus flicking can be eliminated.

15 Claims, 3 Drawing Sheets

(56) References Cited

OTHER PUBLICATIONS

First Chinese Office Action dated Mar. 5, 2014; Appln. No. 201210293396.4.
Extended European Search Report dated Aug. 9, 2016 Appln. No. 13180666.3-1902/2699008.

* cited by examiner

3D DISPLAY DRIVING METHOD, IMAGE PROCESSING METHOD AND 3D DISPLAY DEVICE

TECHNICAL FIELD

The embodiments of the present invention relate to displaying techniques, and particularly, to a 3D display driving method, an image processing method and a 3D display device.

BACKGROUND

Recently, stereo display has become a development trend of display field. Especially, a stereo liquid crystal display (LCD) not only has advantages of a liquid crystal display, such as ultrathin, power-saving, but also may allow a viewer to percept distances of respective objects in an image, and thereby to obtain more full and real information. Therefore, the stereo display has broad application prospect.

The existing stereo LCDs, which operate by means of Polarized Filter, parallax barrier, or Lenticular lens plate, utilize a principle about human eyes' binocular disparity. That is, there is a distance of about 65 mm between two eyes of a human. Thus, the left eye and the right eye will see two slightly different 2D images because of the position difference of two eyes. These two different images are synthesized by the brain of the human, resulting in a stereo image with a depth.

A stereo display technology, referred as Active Retarder (AR), is popular in the art, since it advantageously does not decrease resolution and the glasses thereof are light and portable. An AR 3D display device, as shown in FIG. 2, comprises a display panel 100 and an AR 200 disposed on the display panel 100. The AR, as shown in FIG. 1, comprises an upper substrate 7, a lower substrate 1 and a liquid crystal layer 4 disposed therebetween. A common electrode 6 and an upper alignment layer 5 are provided on the upper layer 7, and a lower alignment layer 3 and several strip-shaped signal electrodes 2 are provided on the lower substrate 1. The AR may be divided into several strip-shaped regions corresponding to the strip-shaped signal electrodes 2, the signal voltage for each strip-shaped region may be controlled independently. When an electric field is applied, LC molecules of the liquid crystal layer are on twisted state and the light passing through the LC layer is twisted 90 degrees. When no electric field is applied, the LC molecules are aligned in the direction perpendicular to the upper substrate surface, and therefore, the polarized direction of the light passing through the LC layer is not changed. The liquid crystal display panel may be other types except for TN type, such as, OCB type, and the application principles are similar. Each strip-shaped region of the AR corresponds to several sub-pixels on the display panel, as shown in FIG. 2.

The prior art driving method for a 3d display with an AR is as following. During the first time period, no electric field is applied to all of ARs 200, the display panel 100 displays a left eye image, and the polarized direction is modulated as left-handed polarized direction. During the second time period, the display panel 100 is line-by-line inputted with the right eye image from the top down (from left to right in FIG. 3), and then an electric field is applied to the first strip-shaped region of the AR 200 so that the polarized direction of exiting light of this area is modulated as right-handed polarized direction and the several sub-pixels corresponding to the first strip will be seen by the right eye of a viewer. In this way, the display panel is controlled to display a right eye image line-by-line, and an electric field is applied to the corresponding AR line by line, and the polarized direction of the exiting light from corresponding sub-pixels is modulated as right-handed polarized light. Thus, left and right eyes of the viewer may both see all pixels of the display so as to achieve a full resolution. In contrast, the manner using a film-type patterned retarder technology will cause resolution decreased by one half. However, the driving method may increase flicking of 3D display, and thus may cause the human eyes to feel tired and other physiological discomforts.

The principle of increasing the flicking of the 3D display is shown in FIG. 3. The AR controls the polarized direction of the exiting light so that a left eye image is scanned first, and then a right eye image is scanned line-by-line from the top down. When the display of that frame is completed, a left eye image is scanned line-by-line from the top down. Since the viewer will see the image through polarizing glasses, the lightness received by a single eye of the viewer is proportional to the area of the image seen by the eye. The dashed line in FIG. 3 represents the varying trend of the lightness received by the left eye as time varies; and the real line represents the varying trend of the lightness received by the right eye. It is apparent from FIG. 3 that the lightness varies greatly in the display process, and thus resulting in flicking, causing the viewer to feel discomfortable.

SUMMARY

Therefore, there is the need for a driving method for reducing the flicking of images in 3D displaying.

The embodiments of the present invention provide a method for driving a 3D display device, wherein the 3D display device comprises an AR and a display panel, the display panel comprising N first pixel regions and N second pixel regions, N being an integer larger than or equal to 1, the AR comprises 2N signal electrode sets, each signal electrode set comprising at least one signal electrode, and each signal electrode set corresponds to at least one pixel region of the display panel, the method comprising:

Upon displaying a current frame, displaying a left eye image on all of the N first pixel regions and a right eye image on all of the N second pixel regions, or displaying the right eye image on all of the N first pixel regions and left eye image on all of the N second pixel regions;

Upon displaying a next frame, if the left eye image is displayed on the first pixel regions, transferring one of the N first pixel regions to display the right eye image, and switching one of the N second pixel regions to display the left eye image. In this way, the switching of the first pixel regions and the second pixel regions is performed alternately until the display of the next frame is completed.

Wherein, the first pixel regions and the second pixel regions are alternately arranged.

Wherein, upon displaying the next frame, sequentially and alternately, one first pixel region displaying the left eye image is transformed to display the right eye image, and one second pixel region displaying the right eye image is transformed to display the left eye image; or sequentially and alternately, one first pixel region displaying the right eye image is transformed to display the left eye image, and one second pixel region displaying the left eye image is transformed to display the right eye image, until the display of the next frame is completed.

Wherein, in the AR, the number of signal electrodes included in each signal electrode set is equal to each other.

Wherein, in the AR, each signal electrode set include only one signal electrode.

Wherein, each signal electrode set corresponds to one pixel region.

The embodiments of the present invention further provide an image processing method based on the above-mentioned 3D display driving method used with an Active Retarder (AR) 3D display device, which comprises steps of:

dividing a 3D image including a left eye image and a right eye image into I lines, I being the number of the signal electrode sets;

switching the left eye image and the right eye image alternately line by line, to generating a 3D image format in which both of the left eye image and the right eye image exist simultaneously;

Transmitting the transformed 3D images to the display panel for displaying.

The embodiments of the present invention further provide a 3D display device, which comprises a display panel, an Active Retarder (AR) disposed on a light exiting surface of the display panel from which light emitted, and a display driving circuit connected with the display panel and the AR, wherein the display panel comprises N first pixel regions and N second pixel regions, N being an integer larger than or equal to 1, the AR comprises 2N signal electrode sets, and each signal electrode set comprises at least one signal electrode, each signal electrode set corresponds to at least one pixel region of the display panel, the display driving circuit applies driving signals to the display panel and the AR.

Wherein, in the AR, the number of the signal electrodes included in each signal electrode set is equal.

Wherein, in the AR, each signal electrode constitutes one signal electrode set.

Wherein, each signal electrode set corresponds to one pixel region of the display panel.

Wherein, the display driving circuit comprises: a timing control circuit, a image driving circuit and a polarization modulation circuit which are connected to the timing control circuit respectively.

The timing control circuit sends a timing control signal to the image driving circuit and the polarization modulation circuit.

The image driving circuit connected to the display panel, receives the timing control signal and applies an image drive signal to the display panel, so that the N first pixel regions all display the left eye image and the N second pixel regions all display the right eye image, or the N first pixel regions all display the right eye image and the N second pixel regions all display the left eye image.

The polarization modulation circuit connected to the AR, receives the timing control signal and applies a polarization modulation signal to the AR, allowing the AR to modulate the phase of linear polarized light emitted from the display panel, to display corresponding image.

The 3D display device further comprises: a grouping switch circuit, the grouping switch circuit comprises a gating circuit and a plurality of gating switches connected with the gating circuit, the gating switches are connected across leaders connected with signal electrodes of the AR in the polarization modulation circuit, the gating circuit connects to the timing control circuit to receive a gating signal from the timing control circuit and to turn on the gating switches selected by the gating signal.

In The embodiments of the present invention, among pixel regions corresponding to signal electrode sets of the AR, any two adjacent pixel regions respectively display the left eye image and the right eye image of one frame simultaneously, so that the display area for the left eye image and right eye image are approximately equal during each time period when switching from a current frame to a next frame, and thus the lightness seen by the left and right eyes there will not change sharply, so that the flicking of image is eliminated.

DETAILED DESCRIPTION

Figure 1:
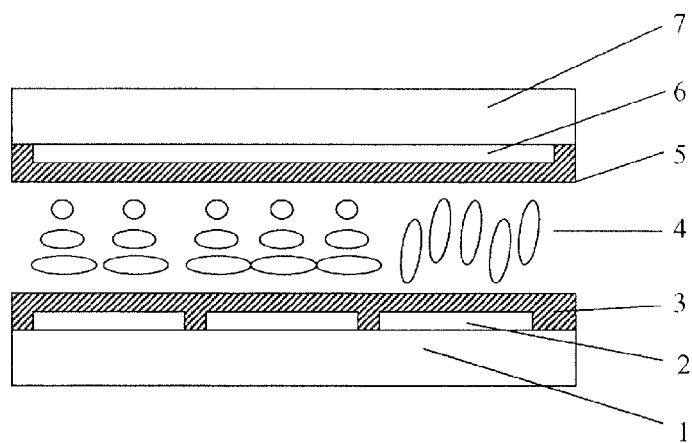
FIG. 1 is a schematic diagram showing the structure of an AR in the prior art.
Figure 2:
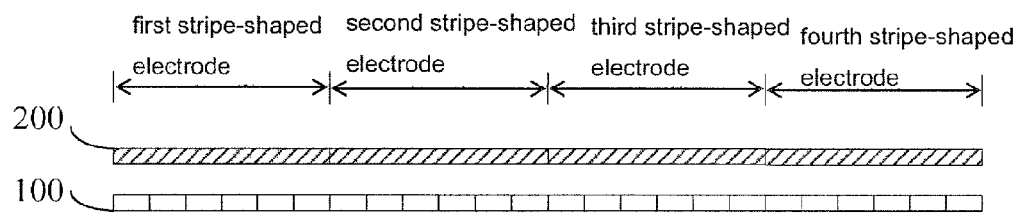
FIG. 2 is a principle diagram showing how an AR makes a 3D display cooperating with a display panel in a 3D display device in the prior art.
Figure 3:
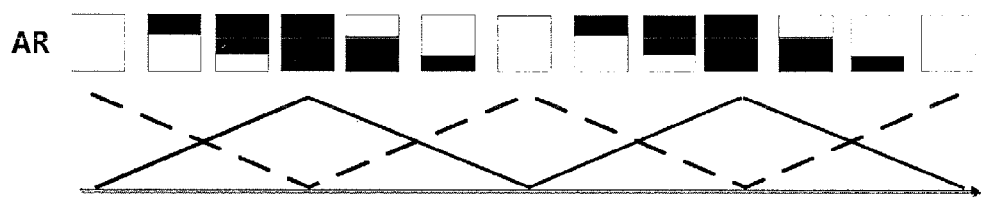
FIG. 3 is a diagram showing 3D display driving principle in the prior art.

The embodiments of the present invention will be described more fully with reference to the accompanying drawings and examples. The following examples are used to explain the embodiments of the present invention, and not intended to limit the scope of the embodiments of the present invention.

Embodiment 1

In the 3D display driving method of the embodiments of the present invention, an active retarder (AR) includes 2N signal electrode sets, each signal electrode set includes at least one signal electrode and at least corresponds to one pixel region. A display panel comprises N first pixel regions and N second pixel regions, wherein N is an integer larger than 1. Upon displaying one frame, N first pixel regions all display a left eye image and N second pixel regions all display the right eye image, or N first pixel regions all display the right eye image and N second pixel regions all display a left eye image. Polarization modulation state of the AR allows the left eye image and the right eye image to be seen by the viewer.

Upon displaying the next frame, if the first pixel regions display a left eye image, one first pixel region selected from the first pixel regions is switched to display the right eye image, and one second pixel region selected from the second pixel regions is switched to display the left eye image. The first pixel regions and the second pixel regions are switched alternately until the display of the next frame is completed. That is, the number of display regions displaying the left eye image and the number of display regions displaying the right eye image is kept always different by one, in order to guarantee that the area of the display regions displaying the left eye image is substantially equivalent to that displaying the right eye image. Therefore, there will not be sharp lightness variation in large area, and thus flicking of image is eliminated.

When one frame is displayed, if N first pixel regions all display the left eye image and N second pixel regions all display the right eye image, the process for scanning the next frame is as followings.

During the time period of $t_1$, the $i^{th}$ first pixel region of the N first pixel regions displays the right eye image, the other N−1 first pixel regions display the left eye image; the $i^{th}$ second pixel region of the N second pixel regions displays the left eye image, the other N−1 second pixel regions display the right eye image, i≤N. The switching of the first and second pixel regions is performed alternately.

During the time period of $t_2$, the $j^{th}$ first pixel region of the N first pixel regions displays the right eye image, the other N−2 first pixel regions (that is, except for the $i^{th}$ and $j^{th}$ first pixel regions) display the left eye image; the $j^{th}$ second pixel region of the N second pixel regions displays the left eye image, the other N−2 second pixel regions (that is, except for the $i^{th}$ and $j^{th}$ second pixel regions) display the right eye image, j≤N.

The process continues in this way, until all first pixel regions display the right eye image and all second pixel regions display the left eye image, that is, display of the frame is completed.

Further, the first pixel regions and the second pixel regions distribute alternatively, and thus, distribution of the left eye image and the right eye image is uniform, and the display effect is improved. Preferably, the number of signal electrodes included in each signal electrode set should be equal. If each signal electrode constitutes one set, the area of each first pixel region and second pixel region should be equal. When the next frame is displayed, sequentially and alternately, one of the first pixel regions is switched from displaying the left eye image to displaying the right eye image, and one of the second pixel regions is switched from displaying the right eye image to displaying the left eye image; or sequentially and alternately, one of the first pixel regions displaying the right eye image is switched to display the left eye image, and one of the second pixel regions displaying the left eye image is switched to display the right eye image.

Figure 4:
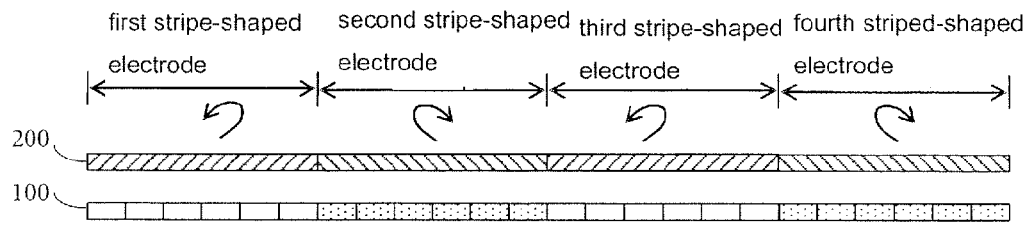
FIG. 4 is a schematic diagram of the first time period when a current frame is displayed in a 3D display driving method according to an embodiment of the present invention.

FIG. 4 shows one example in which four signal electrode sets correspond to four pixel regions of the display panel 100. The odd pixel regions display the left eye image and the AR 200 modulates to be left-handed polarized light correspondingly, while the even pixel regions display the right eye image and the AR 200 modulates to be right-handed polarized light correspondingly.

When the next frame is displayed, all the odd pixel regions are controlled to display the left eye image of the next frame, and all the even pixel regions are controlled to display the right eye image of the next frame. A gate scanning signal controls each line of pixels in the display panel to display the next frame progressively from the top down. Scanning process from a current frame to a next frame is shown as in FIGS. 5-8. The pixel regions of the display panel 100 display the next frame row by row, so that the pixel regions which are displaying the left eye image of the current frame display the right eye image of the next frame, and the pixel regions which are displaying the right eye image of the current frame display the left eye image of the next frame, until the next frame is entirely displayed.

Figure 5:
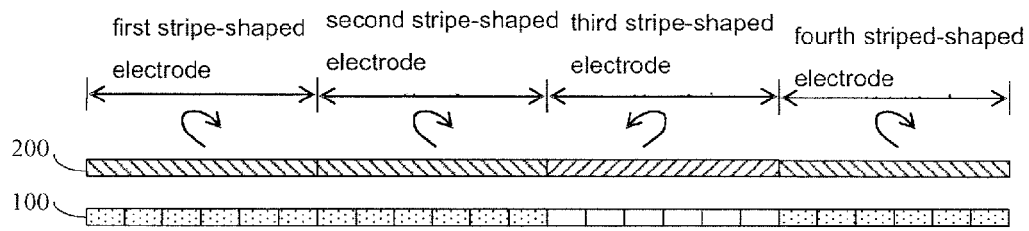
FIG. 5 is a schematic diagram of the second time period when a next frame is displayed.
Figure 6:
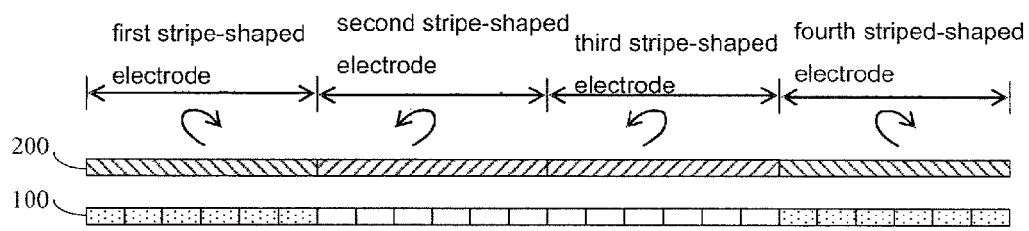
FIG. 6 is a schematic diagram of the third time period when a next frame is displayed.
Figure 7:
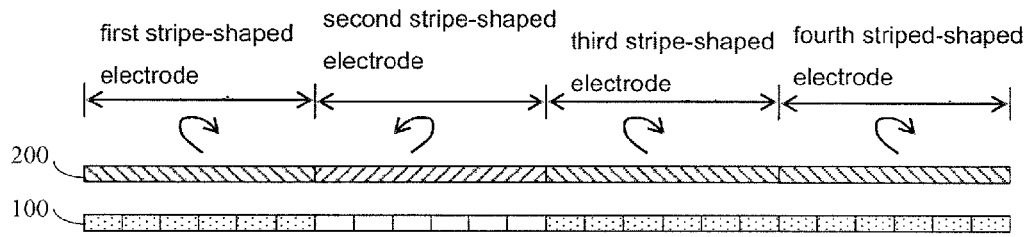
FIG. 7 is a schematic diagram of the fourth time period when a next frame is displayed.
Figure 8:
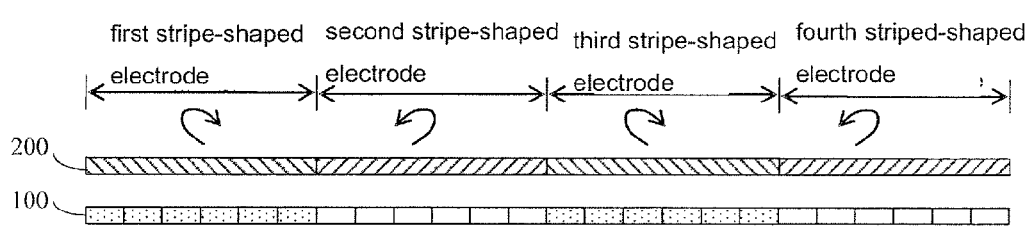
FIG. 8 is a schematic diagram showing when the displaying of the next frame is achieved.

FIG. 4 shows the condition in which the current frame is displayed during the first time period (for example, each signal electrode set include a signal electrode on the AR 200). FIG. 5 shows the condition in which the pixel region corresponding to the first signal electrode set is controlled to display the right eye image of the next frame during the second time period. FIG. 6 shows the condition in which the pixel region corresponding to the second signal electrode set is controlled to display the left eye image of the next frame during the third time period. FIG. 7 shows the condition in which the pixel region corresponding to the third signal electrode set is controlled to display the right eye image of the next frame during the fourth time period. FIG. 8 shows the condition in which the pixel region corresponding to the fourth signal electrode set is controlled to display the left eye image of the next frame finally, and then the display of the next frame is completed. During aforesaid process, the AR 200 accordingly modulates the phase of linear polarized light emitting from the display panel 100 so that both the left eye image and the right eye image to be seen by the viewer through the AR 200.

For example, an AR on a 3D display device include M signal electrodes, each signal electrode being grouped into one set, i.e. the M signal electrodes are grouped into M sets. After a first frame is scanned and before a second frame is scanned, image of M/2 pixel regions can be seen by one eye (through polarizing glasses). When the second frame is scanned, there is always only one pixel region switching from left eye state to right eye state (or from right eye state to left eye state). That is, the lightness seen by one eye is M/2+1 pixel regions' lightness, while the lightness seen by the other eye is M/2−1 pixel regions' lightness. This lightness difference between the pixel regions seen by both eyes is substantially small, and thus flicking may be efficiently decreased, and full resolution display can be achieved.

Embodiment 2

Figure 9:
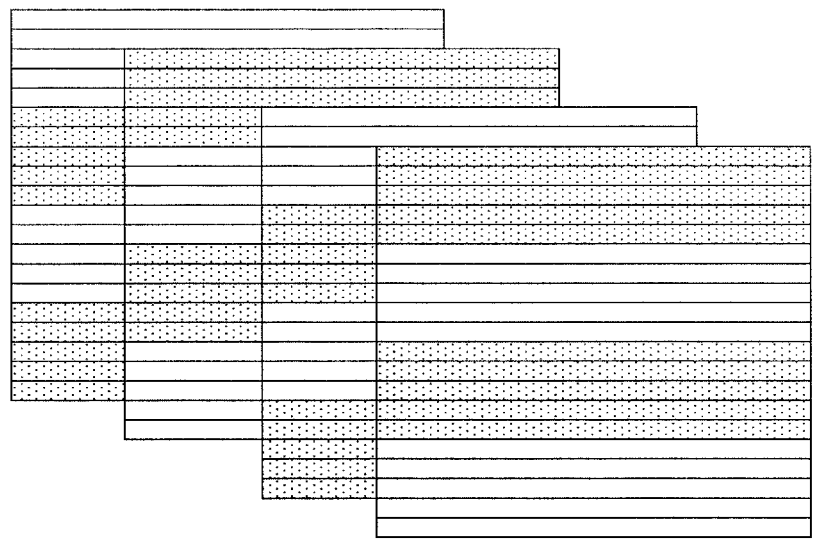
FIG. 9 is a schematic diagram showing the images which are timing sequentially arranged from the top down, wherein the image formats of said images are left-odd-right-even, right-odd-left-even, and so on from the top down.

This embodiment provides an image processing method based on the above-mentioned 3D display driving method, comprising: dividing a left eye 3D image and a right eye 3D image into I lines, respectively, wherein I is the number of the signal electrode sets; alternately switching the left eye image and the right eye image line by line to generate two 3D images, each of which containing both the left eye image information and the right eye image information; transmitting the transformed 3D images to the display panel to be displayed. For example, the controlling width of the AR is n, and the width of each strip shaped electrode set is equal to each other. The left and right images is divided into n lines, respectively, and the left eye image and the right eye image are alternately transformed line by line, which comprises that the $1^{th}$, $3^{th}$, $5^{th}$, . . . , $n-1^{th}$ lines of the left eye image are maintained and the $2^{th}$, $4^{th}$, $6^{th}$, . . . , $n^{th}$ lines of the right eye image are inserted into corresponding positions of the left eye image; while the $1^{th}$, $3^{th}$, $5^{th}$, . . . , $n-1^{th}$ lines of the right eye image are maintained and the $2^{th}$, $4^{th}$, $6^{th}$, . . . , $n^{th}$ lines of the left eye image are inserted into corresponding positions of the left eye image, and finally generating an 3D image format including both the left eye image and the right eye image, that is, a left-odd-right-even image and a right-odd-left-even image. This image is then transmitted to the display panel to be displayed. FIG. 9 is a schematic diagram showing the images which are sequentially arranged from the top down, wherein the image formats of said images are left-odd-right-even, right-odd-left-even, and so on from the top down. The left-odd-right-even image format refers to that the odd lines of the image display the left eye image, and the even lines of the image display the right eye image, vice versa. In 3D display mode, the image seen by the left eye may be displayed in the odd pixel region lines, while the image seen by the right eye may be displayed in the even pixel region lines. Certainly, the n pixel regions may be operated as a period, alternately display images seen by the left eye and images seen by the right eye, this is not limited herein.

Embodiment 3

Figure 10:
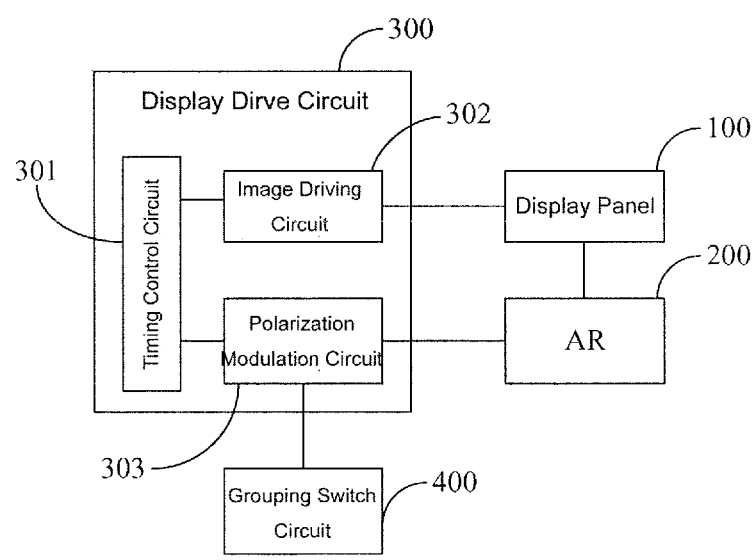
FIG. 10 is a schematic diagram showing the structure of a 3D display device according to an embodiment of present invention.

This embodiment provides a 3D display device, as shown in FIG. 10, comprising: an AR 200 disposed on a light exiting surface of the display panel 100, and a display driving circuit 300 in connection with the display panel 100 and the AR 200, the display driving circuit 300 applying drive signals to the display panel 100 and the AR 200. The AR 200 comprises 2N signal electrode sets, each signal electrode set includes only one signal electrode or more than one adjacent signal electrode, and corresponds to at least one pixel region. The display panel includes N first pixel regions and N second pixel regions, wherein N is an integer larger than one.

Wherein, the display driving circuit 300 may comprise a timing control circuit 301 and an image driving circuit 302 and a polarization modulation circuit 303 which are connected to the timing control circuit 301 respectively.

The timing control circuit 301 may send a timing control signal to the image driving circuit 302 and the polarization modulation circuit 303. The timing control signal may comprise display control signals of the left eye image and right eye image, for controlling the currently displayed image should be the left eye image or the right eye image.

The image driving circuit 302 is connected to the display panel 100 and receives the timing control signal and applies an image drive signal to the display panel 100, so that all of the N first pixel regions display the left eye image, and all of the N second pixel regions display the right eye image, or, all of the N first pixel regions display the right eye image, and all of the N second pixel regions display the left eye image.

The polarization modulation circuit 303 is connected to the AR 200 and receives the timing control signal and applies a polarization modulation signal to the AR 200, so that the AR 200 to modulate the phase of linear polarized light exiting from the display panel 100.

Upon displaying a current frame, the image driving circuit 302 controls the display panel 100 so that the all of N first pixel regions display the left eye image and the all the N second pixel regions display the right eye image, or, all of the N first pixel regions display the right eye image and all of the N second pixel regions display the left eye image. At the same time, the polarization modulation circuit 303 controls the AR 200 so that the AR 200 correspondingly modulates the phase of linear polarized light exiting from the display panel 100, so that the left eye image and the right eye image can both be seen by the viewer through the AR 200.

Upon displaying the next frame, if the first pixel regions are displaying the left eye image, the image driving circuit 302 controls the display panel 100 to switch one of the first pixel regions to display the right eye image, and to switch one of the second pixel regions to display the left eye image.

In this way, the first pixel regions and the second pixel regions are switched alternately until the display of the next frame is completed. At the same time, the polarization modulation circuit 303 controls the AR 200 so that the AR 200 correspondingly modulates the phase of linear polarized light exiting from the display panel 100, so that all of the left eye image and the right eye image on the AR 200 can be seen by the viewer.

Further, the first pixel regions and the second pixel regions distribute alternatively, and thus, distribution of the left eye image and the right eye image is uniform, and the display effect is improved. Preferably, the number of signal electrodes included in each signal electrode set should be equal. If each signal electrode constitutes one set, the area of each first pixel region and second pixel region should be equal. When the next frame is displayed, the image driving circuit 302 controls the display device 100, sequentially and alternately, to switch one of the first pixel regions from displaying the left eye image to displaying the right eye image, and to switch one of the second pixel regions from displaying the right eye image to displaying the left eye image; or, sequentially and alternately, to switch one of the first pixel regions displaying the right eye image to displaying the left eye image, and to switch one of the second pixel regions displaying the left eye image to displaying the right eye image, until the next frame is entirely displayed. The display drive circuit 300 controls the display device 100 and the AR 200 to perform the driving method as shown in FIGS. 4-8.

In order to dynamically group signal electrodes of the AR 200, the 3D display device further comprises a grouping switch circuit 400. The grouping switch circuit 400 comprises a gating circuit and a plurality of gating switches connected with the gating circuit, the gating switches are connected to signal electrodes of the AR 200 with leaders in the polarization modulation circuit 303. The gating circuit is connected to the timing control circuit 301 to receive a gating signal from the timing control circuit and to turn on the gating switches selected by the gating signal.

In the 3D display device according to the embodiments of the present invention, the display area for the left image and that for the right eye image are approximately equal during each time period when switching a current frame to a next frame, and thus there will be little difference between the display area of the left eye image and the one of the right eye image during switching. Therefore, the lightness received by the left and right eyes will not change sharply, and thus the flicking of image is eliminated.

While the invention has been illustrated in above general description and specific embodiments, it is apparent that, on the basis of the invention, the skilled person in the art is capable of making modifications or improvements without departing from the spirit of the invention, and these modifications or improvements should belong to the claimed scope of the invention.

The invention claimed is:

1. A Method for driving a 3D display device comprising an Active Retarder (AR) and a display panel, wherein the display panel comprises N first pixel regions and N second pixel regions, N being an integer larger than or equal to 1, and wherein the AR comprises 2N signal electrode sets, each signal electrode set comprising at least one signal electrode, and each signal electrode set corresponding to at least one pixel region, the method comprising:

upon displaying a current frame, displaying a left eye image on all of the N first pixel regions and a right eye image on all of the N second pixel regions;

upon displaying a next frame, firstly switching one of the N first pixel regions from displaying the left eye image to the right eye image, and then switching at least one of the N second pixel regions from displaying the right eye image to the left eye image, and in this way, the first pixel regions and the second pixel regions are switched alternately one by one until the display of the next frame is completed.

2. The method according to claim 1, wherein the first pixel regions and the second pixel regions are alternately arranged.

3. The method according to claim 2, further comprising when displaying the next frame, sequentially and alternately switching one first pixel region from displaying the left eye image to displaying the right eye image and switching one second pixel region displaying the right eye image to displaying the left eye image, until the display of the next frame is completed.

4. The method according to claim 1, wherein each signal electrode set in the AR includes the same number of signal electrodes.

5. The method according to claim 1, wherein each signal electrode set in the AR includes only one signal electrode.

6. The method according to claim 1, wherein each signal electrode set in the AR includes more than one adjacent signal electrode.

7. The method according to claim 1, wherein each signal electrode set corresponds to one pixel region.

8. An image processing method based on the method according to claim 1, comprising:
dividing a left eye 3D image and a right eye 3D image into I lines, respectively, I being the number of the signal electrode sets;
switching the left eye image and the right eye image alternately line by line to generate two 3D images, in each of the two 3D images both of the left eye image information and the right eye image information exist simultaneously;
transmitting the transformed 3D images to the display panel for displaying.

9. A 3D display device that is driven according the method defined by claim 1, comprising a display panel, an Active Retarder (AR) disposed on a light exiting surface of the display panel, and a display driving circuit in connection with the display panel and the AR, wherein the display panel comprises N first pixel regions and N second pixel regions, N being an integer larger than or equal to 1, and wherein the AR comprises 2N signal electrode sets, each signal electrode set comprising at least one signal electrode, each signal electrode set corresponding to at least one pixel region of the display panel, and the display driving circuit applying drive signals to the display panel and the AR.

10. The 3D display device according to claim 9, wherein each signal electrode set in the AR includes the same number of signal electrodes.

11. The 3D display device according to claim 9, wherein each signal electrode set in the AR includes only one signal electrode.

12. The 3D display device according to claim 9, wherein each signal electrode set in the AR includes more than one adjacent signal electrode.

13. The 3D display device according to claim 9, wherein each signal electrode set corresponds to one pixel region of the display panel.

14. The 3D display device according to claim 9, wherein the display driving circuit comprises: a timing control circuit, an image driving circuit and a polarization modulation circuit, the image driving circuit and the polarization modulation circuit being connected to the timing control circuit respectively; wherein,
the timing control circuit sends a timing control signal to the image driving circuit and the polarization modulation circuit;
the image driving circuit is connected to the display panel and receives the timing control signal and applies an image drive signal to the display panel so that the N first pixel regions are all used to display the left eye image and the N second pixel regions are all used to display the right eye image;
the polarization modulation circuit connected to the AR, receiving the timing control signal and applies a polarization modulation signal to the AR so that the AR modulates the phase of linear polarized light exiting from the display panel.

15. The 3D display device according to claim 14, further comprises a grouping switch circuit, the grouping switch circuit comprising a gating circuit and a plurality of gating switches connected to the gating circuit, the gating switches being connected to signal electrodes of the AR with leaders in the polarization modulation circuit, and the gating circuit being connected to the timing control circuit to receive a gating signal from the timing control circuit and to turn on the gating switches selected by the gating signal.

* * * * *